United States Patent [19]
Amlie

[11] 3,977,250
[45] Aug. 31, 1976

[54] ENCODING ALTIMETER

[76] Inventor: Thomas S. Amlie, 6415 Bradley Blvd., Bethesda, Md. 20034

[22] Filed: May 2, 1975

[21] Appl. No.: 574,115

[52] U.S. Cl. .................................................. 73/386
[51] Int. Cl.² .......................................... G01L 7/12
[58] Field of Search.......... 73/386, 387, 384, 178 R; 340/27 NA; 244/77 DA

[56] References Cited
UNITED STATES PATENTS

| 2,729,780 | 1/1956 | Miller et al. | 244/77 DA |
| 3,057,583 | 10/1962 | Majendie et al. | 244/77 DA |
| 3,282,110 | 11/1966 | Weir | 73/386 |
| 3,668,933 | 6/1972 | Blom-Bakke | 73/386 |
| 3,750,473 | 8/1973 | Bennett et al. | 73/387 |

Primary Examiner—Donald O. Woodiel
Attorney, Agent, or Firm—R. S. Sciascia; Roy Miller

[57] ABSTRACT

An encoding altimeter incorporating a feedback loop for providing visual output to a pilot of instantaneous barometric altitude and electrical signals which may be used for navigation or collision avoidance.

1 Claim, 3 Drawing Figures

ENCODING ALTIMETER

BACKGROUND OF THE INVENTION

1. Field of the Invention

In recent years, the use of aircraft as a transportation and recreation medium has become extremely widespread, resulting in a tremendous growth of private, commercial and military aircraft. As the number of aircraft has increased, the probability of mid-air collisions has also increased. Several methods are being advanced to automatically prevent mid-air collisions, principally by the use of various radio communication techniques. Some of the methods rely on direct radio communications between the involved aircraft. Other methods utilize ground-based control systems and send maneuver commands to the involved aircraft which theoretically resolve the potential conflict. Both the air-derived and ground-derived collision avoidance systems require that accurate information pertaining to aircraft altitude be transmitted by some form of radio communication. However, presently available barometric encoding altimeters are both expensive and unreliable.

2. Description of the Prior Art

FIG. 1 is a schematic of a prior art conventional altimeter. The altimeter is driven by an aneroid bellows 10 as the ambient air pressure (static pressure) on the outside of the bellows increases or decreases. As the aircraft climbs to a higher altitude, the spring constant of the bellows material causes the bellows to extend, driving the linkage 12 and gears 13. The gears 13 are connected to needles 14 on dial 17 and drive the needles to provide a visual display of altitude to the pilot. Also connected to the gearing is an encoder 15 which provides electrical signals to other equipment. Temperature compensating means 16 are also provided around the bellows 10 to keep the accuracy of the instrument within tolerance as the ambient temperature varies and the mechanical properties of the materials change incident thereto. The compensation is generally embodied in some form of bimetallic spring.

The fundamental problem with the conventional type altimeter is that all the energy to drive the gears, indicating hands and encoder must come from the mechanical energy stored in the spring material of the aneroid bellows working against the static air pressure acting on the end of the bellows. The forces and motions involved are so small that precise, low friction mechanisms are a necessity. Also required are great care and skill in the assembly, adjustment and calibration of the instruments. The minuteness of the available forces mitigates against using mechanical contacts for the encoding function but rather require relatively high cost precision electro-optical position encoders. This in turn leads to a costly and fragile instrument.

It will be further appreciated that the accuracy of the instrument depends upon the mechanical characteristics of the bellows 10 as it extends and contracts under the influence of the changing static air pressure. Any friction or binding of the mechanism will cause errors because of the very small forces available. Also, any change in the mechanical characteristics of the bellows due to, for instance, temperature change will also cause errors unless properly compensated for.

SUMMARY OF THE INVENTION

The present invention comprises an apparatus for providing an accurate and inexpensive aircraft encoding altimeter which provides both a visual indication to the aircraft pilot of his instantaneous barometric altitude and also provides electrical signals defining those altitudes. The electrical signals can be used in equipment on the aircraft for the purpose of navigation or for collision avoidance. The signals can also be used to modify signals transmitted by the aircraft to a ground-based air traffic control system so that the ground-based air traffic control system is automatically aware of the altitude of the aircraft. The apparatus incorporates a force-rebalance servo mechanism apparatus which consists of a motor driving a specially shaped cam. The cam in turn is connected to a spring which exerts force on the diaphragm of a bellows. The diaphragm forms one end of an evacuated bellows.

The ambient barometric air pressure (called static pressure) also exerts force on the diaphragm. A very sensitive electromagnetic sensor which is operatively connected to the diaphragm senses any diaphragm motion and by means of electronic amplification causes the motor to turn the cam in the proper direction to change the force exerted by the spring on the diaphragm and move the diaphragm back to a null position. The shape of the cam is made to match the nonlinear pressure-versus-altitude function in a way such that the angular position of the cam is directly proportional to the pressure altitude of the aircraft at any given altitude. The angular position of the cam is transmitted through appropriate gears and other mechanisms and is displayed to the pilot as altitude and is also used to position electrical encoding devices to provide the electrical signals.

DESCRIPTION OF THE PREFERRED EMBODIMENT

Figure 2:
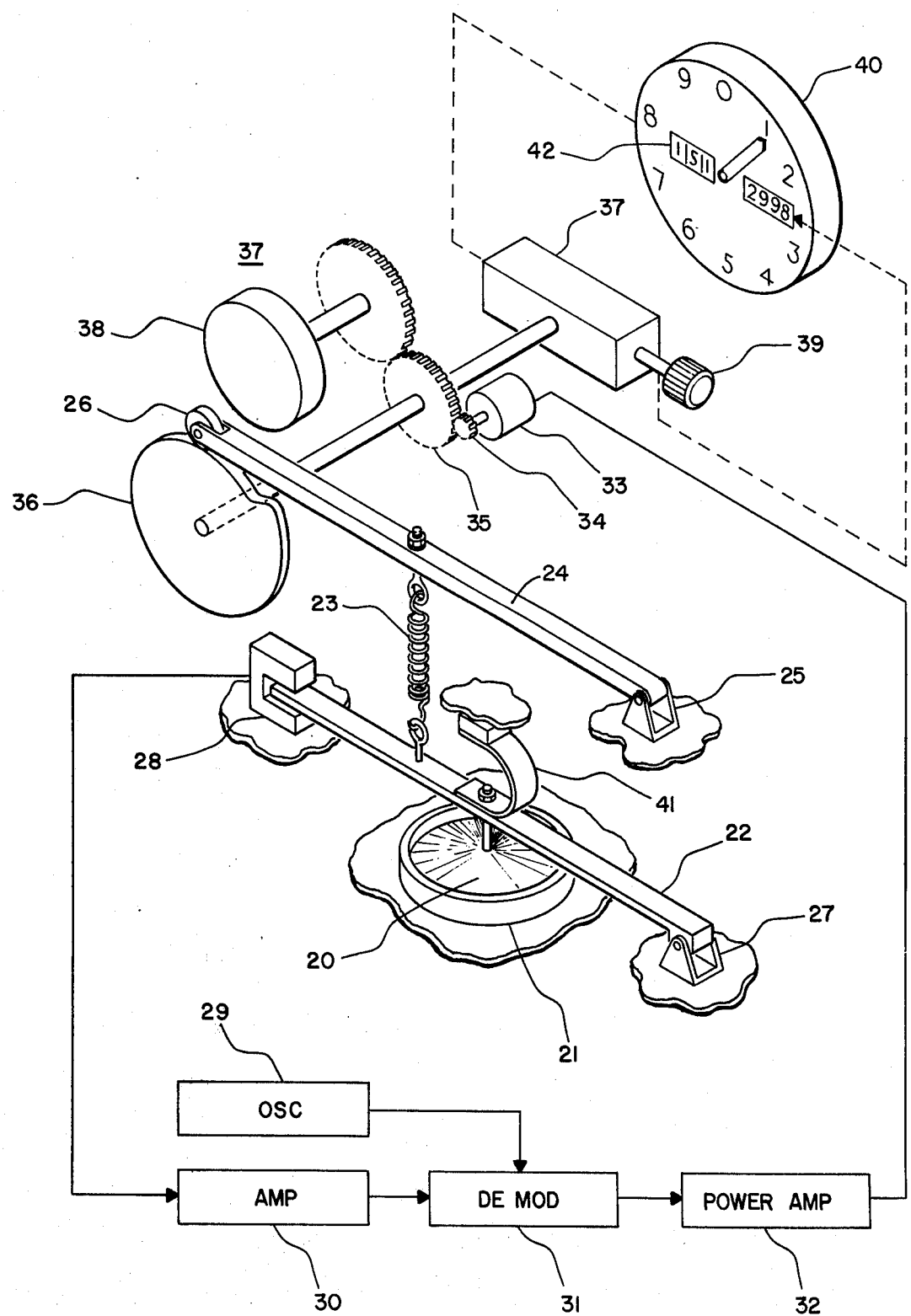
FIG. 2 is a schematic diagram of an preferred embodiment of the present invention.

A preferred embodiment of the invention is shown diagrammatically in FIG. 2. A diaphragm 20 comprises one surface of a small evacuated vessel 21 and is connected to a lever arm 22. The lever arm 22 is connected to one end of a spring 23 the other end of which is connected to a cam follower arm 24 which in turn is fixed at one end as at 25 and at the other end to a cam follower 26. The lever arm 22 is fixed at one end as at 27 and the other end thereof is optimally held in a null position between the open jaws of a very sensitive electro-magnetic variable reluctance position sensor 28. The variable reluctance position sensor 28 measures the motion of the lever arm 22 at any given instant when it deviates from a null position.

The output of the variable reluctance sensor 28 is connected as an input to an amplifier 30 the output of which is coupled as an input to a demodulator 31. Output from an oscillator 29 is connected as another input to the demodulator 31 which uses the oscillator output as a reference voltage. The output of the demodulator 31 is fed to a power amplifier 32 the output of which is connected to a motor 33 having a gear 34 on the output shaft thereof. The motor 33 drives the gear 34 which engages gear 35 on a shaft which in turn is connected at one end to a precision cam 36 and at the other end thereof to a mechanical differential 37. Cam follower 26 rides on the periphery of the cam 36 and is biased thereon by spring 23.

Gear 35 also engages an encoder indicated generally at 38. A baroset knob 39 is connected mechanically to the mechanical differential and also has a connection to a pilots display 40 indicated by the dotted line thereto. Mechanical differential also couples an output to the pilots display 40 as shown by the dotted line from the other end thereof from the baroset knob 39.

In operation, as the pilot changes altitude the diaphragm 20 deflects, causing lever arm 22 to change from a null position with respect to the sensor 28. This produces an output signal which is coupled to the associated amplifier, demodulator and power amplifier to the motor 33. The motor turns until the cam 36 reaches a position where the force exerted by the static air pressure on the bellows is exactly balanced by the force exerted by the spring 23. It will be recognized that the accuracy of the system now depends only upon the shape of the precision cam 36 and the spring constant of a simple coil spring 23. The spring can be made from one of any available alloys which have excellent mechanical properties such as good linearity, low hysteresis and very small changes of properties with temperature. Additionally, because the lever arm 22 moves only a few millionths of an inch before the motor acts to return it to its null position, it is possible to connect a simple bi-metallic spring 41 to the lever arm for temperature compensation in the event that it is required.

Inasmuch as the accuracy of the system is controlled by the cam 36 and the spring 23 and adequate surplus torque is available from the gearhead motor 33, it is possible to add a low cost mechanical brush encoder 38 to the system and also to add relatively low cost non-precision drum type digital indicators 42 to the pilots display 40. In the present altimeters, these drum displays add substantial cost because they must be made to have very low friction in view of the small forces available from the bellows used.

The shape of the cam is given by the equation $R_y = R_o P_y/P_o$ where $R_y$ is the radius at a given altitude, $R_o$ is the radius of the cam at sea level, $P_y$ is the barometric pressure at a given altitude and $P_o$ is the barometric pressure at sea level.

Figure 1:
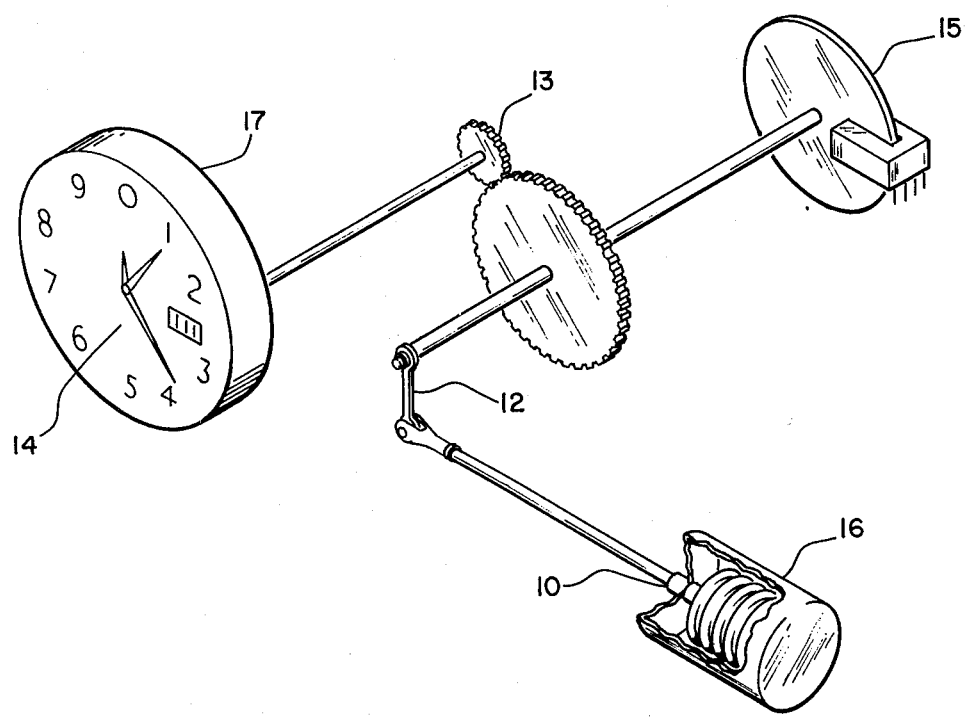
FIG. 1 is a schematic diagram of an exemplary prior art altimeter.
Figure 3:
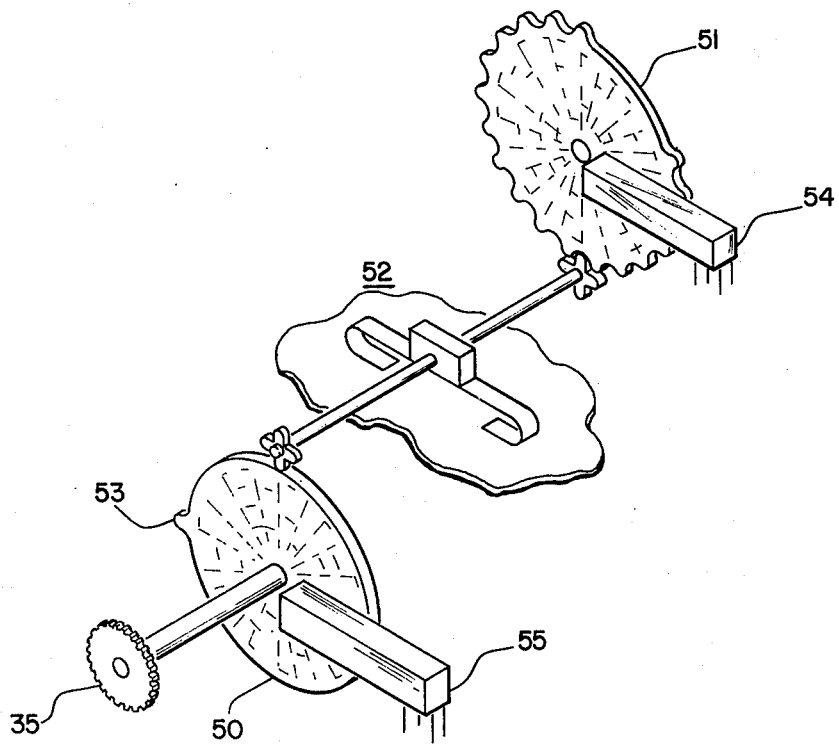
FIG. 3 is a schematic diagram showing further detail of the encoder.

The encoder 38 is shown in more detail in FIG. 3. The encoder indicated at 38 actually comprises two discs 50 and 51. Disc 50 is driven directly by the gearhead motor through the gear 35 shown in FIG. 2. The second disc 51 is driven by a Geneva mechanism 52 from the first gear 50. This avoids the basic problem of a single disc or direct geared encoder which must be fabricated and installed with extreme precision. A numerical example may help to illustrate the point. Assume an altimeter which is designed for use up to 48,000 feet altitude and which must encode altitude to an accuracy of ±40 feet. This implies the encoder must be made so that it will switch with an accuracy of 40 ÷ 48,000 = ± 1/1200 of a revolution. This is within present state of the art but does require precision in fabrication and assembly. A double disc direct geared encoder will also have the same problem insofar as the lower speed disc is concerned. That is, the higher speed disc might be made to turn one revolution per 4,000 or 8,000 feet, thus reducing the accuracy requirement by a factor of 12 or 6 respectively. However, the lower speed disc will still turn only one revolution for 48,000 feet and will require the precision described above.

The present invention eliminates this problem by using an intermittent motion or Geneva mechanism to drive the low speed disc. The high speed disc might turn at one revolution per 4,000 feet of altitude and once each revolution would engage the Geneva mechanism and index the low speed disc by one increment or gear tooth. This is accomplished by providing one tooth 53 on the high speed disc 50 which engages the Geneva mechanism 52 thereby turning the low speed disc 51. Thus, the low speed disc has a average motion which is only 1/12 that of the high speed disc but the motion would occur in discrete steps. Therefor, while the Geneva mechanism was engaged, the low speed disc would turn at the same speed as the high speed disc. The switching points would thereby be sharply defined during this motion. This in turn makes the requirement for precision of the low speed disc and indexing of the encoding contacts no greater than the requirements on the high speed disc. Contact assemblies are indicated diagrammatically at 54 and 55 for the low and high speed disc respectively.

Adequate torque is available through the present invention, to drive any combination of needle and drum indicators for presenting the altitude to the pilot and the indicators could be made inexpensively because the requirements for low mass, very low friction and good mechanical balance are eliminated. It will be understood that certain features must be added to conform to present aeronautical practice but the features do not necessarily form a part of the invention. This would include the mechanical differential which is necessary in order to be able to base the altitude indication to the pilot on local barometric pressure and the signals from the encoder on the standard atmospheric pressure (29.92" of Mercury). It is also to be understood that various other equivalents might be substituted for the various parts of the mechanism such as a piezoelectric transducer which would be responsive to barometric pressure in place of the evacuated chamber 21. Also, a linear cam and rachet mechanism driven by the motor 33 might be utilized in place of the esentially circular cam 36 and cam follower 26. Further, a direct connection in place of spring 23 might be utilized with the cam follower arm 24 being spring biased to keep the cam follower 26 in direct contact with the cam 36. It is also to be understood that an electronic feedback might be utilized instead of the mechanical cam and cam follower arrangement.

What is claimed is:

1. An encoding altimeter including;
    a barometric pressure-responsive bellows responsive to the static pressure at a given altitude;
    electronic null sensing means for producing an output signal;
    connecting means connected to said bellows and coacting with said null sensing means so that a change in static pressure results in an output signal representative of the change from said null sensing means;
    said connecting means normally being in a null position with respect to said null sensing means;
    power amplifying means operatively receiving the output signal from said null sensing means;

motor means operatively connected to said power amplifying means;

said motor means producing an output in response to a change in static pressure as detected by said null sensing means;

a feedback loop operatively connected from said motor means to said bellows for returning said connecting means to a null position with respect to said null sensing means;

said feedback loop comprising a cam operatively connected to said motor means and moveable under the influence thereof;

said cam having a profile corresponding to $Ry = Ro\, Py/Po$ where Ry corresponds to the altitude at sea level or 1, Py = the pressure at a given altitude and Po = the pressure at sea level;

means operatively connected between the cam profile and the connecting means for causing said connecting means to return to a null position under influence of movement of the cam;

encoding means operatively connected to said motor means for outputting a signal indicative of static pressure at a given altitude;

said encoding means comprising two interconnected encoding disc;

one disc being directly interconnected with said motor means and said other disc being driven by a Geneva mechanism from said first encoding disc so that the two discs turn at a predetermined ratio with respect to each other.

* * * * *